US012755497B2

(12) United States Patent
Hsu et al.

(10) Patent No.: US 12,755,497 B2
(45) Date of Patent: Oct. 6, 2026

(54) METHOD FOR IMPROVING MIXED REALITY SERVICE AND HOST

(71) Applicant: HTC Corporation, Taoyuan City (TW)

(72) Inventors: Jo-Han Hsu, Taoyuan City (TW); Ci Syuan Yang, Taoyuan City (TW)

(73) Assignee: HTC Corporation, Taoyuan City (TW)

( * ) Notice: Subject to any disclaimer, the term of this patent is extended or adjusted under 35 U.S.C. 154(b) by 108 days.

(21) Appl. No.: 18/917,958

(22) Filed: Oct. 16, 2024

(65) Prior Publication Data

US 2025/0252678 A1 Aug. 7, 2025

Related U.S. Application Data

(60) Provisional application No. 63/627,805, filed on Feb. 1, 2024.

(51) Int. Cl.
*G06T 19/00* (2011.01)

(52) U.S. Cl.
CPC .................................. *G06T 19/006* (2013.01)

(58) Field of Classification Search
CPC .. G06T 19/006; H04N 13/207; H04N 13/261; H04N 13/332; H04N 13/395
See application file for complete search history.

(56) References Cited

U.S. PATENT DOCUMENTS

| | | | | |
|---|---|---|---|---|
| 2024/0121370 | A1* | 4/2024 | Xiong | H04N 13/111 |
| 2024/0223742 | A1* | 7/2024 | Xiong | G06T 19/006 |

FOREIGN PATENT DOCUMENTS

| | | | |
|---|---|---|---|
| CN | 114119772 | A | 3/2022 |
| CN | 114926542 | A | 8/2022 |
| CN | 117234281 | A | 12/2023 |
| CN | 117475007 | A | 1/2024 |

OTHER PUBLICATIONS

"Office Action of Taiwan counterpart Application", issued on Sep. 15, 2025, p. 1-p. 7.

* cited by examiner

*Primary Examiner* — Daniel F Hajnik
*Assistant Examiner* — Chris Alejandro Puntier
(74) *Attorney, Agent, or Firm* — JCIPRNET

(57) ABSTRACT

The embodiments of the disclosure provide a method for improving a mixed reality service and a host. The method includes the following. A reference image for rendering a pass-through view is obtained from a color camera of the host. Coordinate transformation information is determined based on camera information of the host. The coordinate transformation information is used to convert a rendering position from a preset rendering position to a reference rendering position. A reference reprojection parameter is determined based on a preset reprojection parameter, the camera information of the host, and the coordinate transformation information. A virtual object corresponding to a target object to be rendered is rendered based on object information of the target object to be rendered and the coordinate transformation information. The virtual object is combined with the reference image into the pass-through view. The pass-through view is reprojected into visual content of the mixed reality service based on the reference reprojection parameter, and the visual content is displayed.

12 Claims, 4 Drawing Sheets

METHOD FOR IMPROVING MIXED REALITY SERVICE AND HOST

CROSS-REFERENCE TO RELATED APPLICATION

This application claims the priority benefit of U.S. provisional application Ser. No. 63/627,805, filed on Feb. 1, 2024. The entirety of the above-mentioned patent application is hereby incorporated by reference herein and made a part of this specification.

BACKGROUND

Technical Field

The disclosure relates to a mechanism for providing a reality service, and more particularly, to a method for improving a mixed reality service and a host.

Description of Related Art

In a mixed reality (MR) head-mounted display, in order to generate a pass-through view from a user's viewing angle, it is usually necessary to use image data obtained from a color camera (which can also be referred to as an RGB camera) to be combined calculated depth information for depth warping processing. However, since a position of the color camera is different from a position of eyes of the user, if a precise depth warping algorithm is directly applied, it will easily cause a warping effect on an image, thus affecting a visual experience. In addition, the warping effect may adversely affect alignment of mixed reality content (such as a rendered MR object) with the pass-through view. In this case, it will be difficult to take into account both visual comfort and alignment accuracy of the MR object and the pass-through view.

SUMMARY

In view of the above, the disclosure provides a method for improving a mixed reality service and a host, which may be used to solve the above technical issues.

The embodiment of the disclosure provides a method for improving a mixed reality service, executed by a host, including the following. A reference image for rendering a pass-through view is obtained from a color camera of the host. Coordinate transformation information is determined based on camera information of the host. The coordinate transformation information is used to convert a rendering position from a preset rendering position to a reference rendering position. A reference reprojection parameter is determined based on a preset reprojection parameter of the host, the camera information of the host, and the coordinate transformation information. A virtual object corresponding to a target object to be rendered is rendered based on object information of the target object to be rendered and the coordinate transformation information. The virtual object is combined with the reference image into the pass-through view. The pass-through view is reprojected into visual content of the mixed reality service based on the reference reprojection parameter, and the visual content is displayed.

The embodiment of the disclosure provides a host for improving a mixed reality service, including a storage circuit and a processor. The storage circuit stores a program code. The processor is coupled to the storage circuit and accesses the program code to obtain a reference image for rendering a pass-through view from a color camera of the host, determine coordinate transformation information based on camera information of the host, in which the coordinate transformation information is used to convert a rendering position from a preset rendering position to a reference rendering position, determine a reference reprojection parameter based on a preset reprojection parameter of the host, the camera information of the host, and the coordinate transformation information, render a virtual object corresponding to a target object to be rendered based on object information of the target object to be rendered and the coordinate transformation information, combine the virtual object with the reference image into the pass-through view, and reproject the pass-through view into visual content of the mixed reality service based on the reference reprojection parameter, and displaying the visual content.

DETAILED DESCRIPTION OF DISCLOSED EMBODIMENTS

Figure 1:
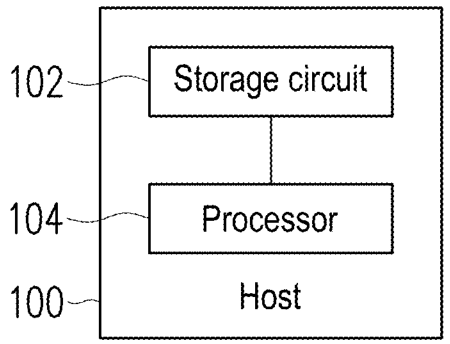
FIG. 1 is a schematic view of a host according to an embodiment of the disclosure.

Referring to FIG. 1, FIG. 1 is a schematic view of a host according to an embodiment of the disclosure. In various embodiments, a host 100 may be any device that can perform tracking functions (e.g., inside-out tracking and/or outside-in tracking) on one or more target objects (also called objects to be tracked, trackable objects, etc., such as hands of the user for the host 100) within a tracking range of the host 100. In an embodiment of the disclosure, the host 100 may be provided with a tracking camera, and an image capturing range thereof corresponds to the tracking range. When the target object (for example, the hand) is within the tracking range, the tracking camera on the host 100 may capture an image of the target object, and the host 100 may track a pose of each of the target objects according to the captured image, but the disclosure is not limited thereto.

In various embodiments, the host 100 can be any smart device and/or computer device that can provide visual content of a reality service, such as a virtual reality (VR) service, an augmented reality (AR) service, a mixed reality (MR) service and/or an extended reality (XR) service, but the disclosure is not limited thereto. In some embodiments, the host 100 may be a head-mounted display (HMD) that may display/provide the visual content (e.g., AR/VR/MR content) for the wearer/user to watch. In order to better understand the concept of the disclosure, it is assumed below that the host 100 is an MR device (e.g., MR HMD) used to provide the MR content for the user to watch, but the disclosure is not limited thereto.

In an embodiment where the visual content is the MR content, the MR content may include a pass-through view. In an embodiment, the MR content may further include at least one rendered virtual object overlaid/superimposed on the pass-through view. In this case, the pass-through view is used as an underlying image of the visual content, but the disclosure is not limited thereto.

In an embodiment, the pass-through view may be rendered by a processor 104 of the host 100 according to an image frame (e.g., an RGB image frame) captured by a color camera (e.g., a front camera) of the host 100. In a case where the color camera is a front camera, the user wearing the host 100 (e.g., HMD) may see a real-world scene in front of the user through the pass-through view in the visual content provided by the host 100.

In an embodiment, the processor 104 may render one or more virtual objects according to an MR application currently running on the host 100, and the processor 104 may overlay the rendered virtual objects on the rendered pass-through view to form/generate the visual content (e.g., the MR content).

In an embodiment, the host 100 may be provided with a built-in display (e.g., near-eye displays corresponding to the eyes of the user) to display the visual content for the user to watch. Additionally or alternatively, the host 100 may be connected to one or more external displays, and the host 100 may transmit the visual content to the external display for the external display to display the visual content, but the disclosure is not limited thereto.

In FIG. 1, the host 100 includes a storage circuit 102 and the processor 104. The storage circuit 102 is one or more static or dynamic random access memory (RAM), read only memory (ROM), flash memory, hard disk, or a combination of any other similar devices, which records multiple modules that may be executed by the processor 104.

The processor 104 may be coupled to the storage circuit 102. The processor 104 may be, for example, a general-purpose processor, a special-purpose processor, a conventional processor, a digital signal processor (DSP), multiple microprocessors, one or more microprocessors associated with a DSP core, a controller, a microcontroller, an application specific integrated circuits (ASIC), a field programmable gate array (FPGA) circuit, any other type of integrated circuits (IC), a state machine, a graphic processing unit (GPU), etc.

In an embodiment of the disclosure, the processor 104 may access modules and/or program codes stored in the storage circuit 102 to implement a method for improving the mixed reality service provided in the disclosure, which will be further discussed below.

Figure 2:
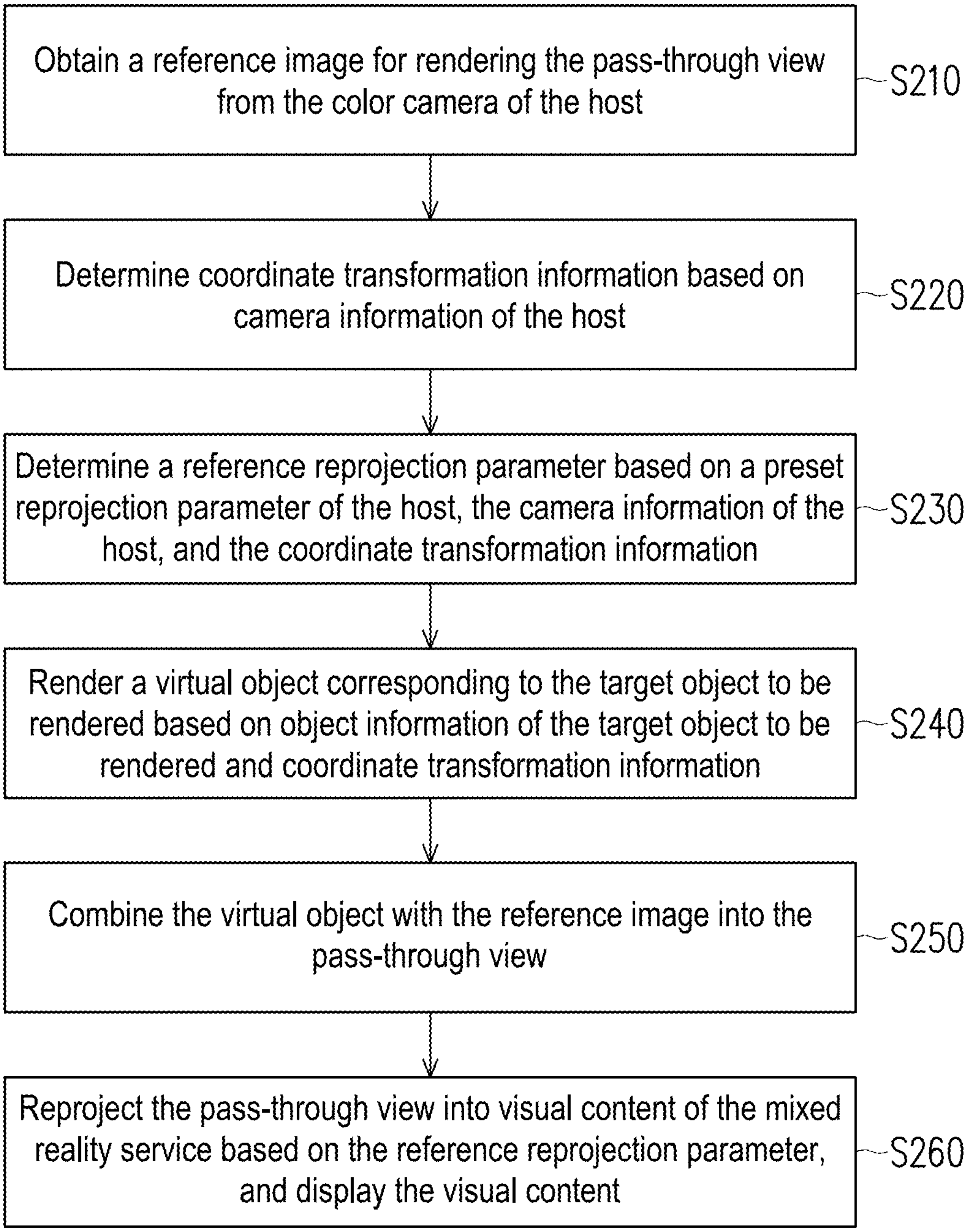
FIG. 2 is a flow chart of a method for improving a mixed reality service according to an embodiment of the disclosure.
Figure 3:
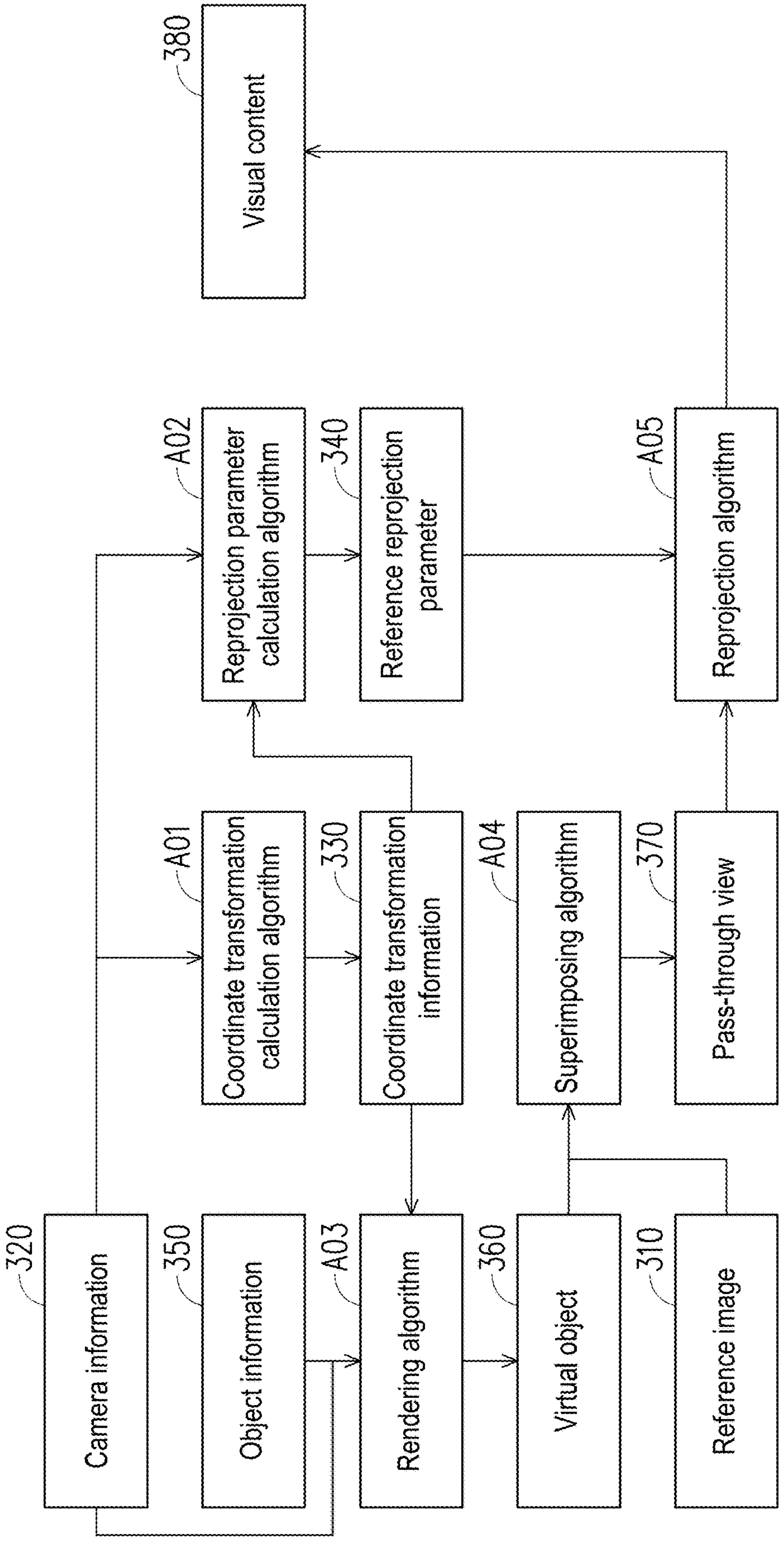
FIG. 3 is a schematic diagram of an application scenario according to an embodiment of the disclosure.

Referring to FIG. 2, FIG. 2 is a flow chart of a method for improving a mixed reality service according to an embodiment of the disclosure. The method in this embodiment may be executed by the host 100 in FIG. 1, and details of each of steps in FIG. 2 will be described in conjunction with the elements shown in FIG. 1. In addition, in order for the concept of the disclosure to be easier to understand, FIG. 3 would be used as an example for description, wherein FIG. 3 is a schematic diagram of an application scenario according to an embodiment of the disclosure.

In step S210, the processor 104 obtains a reference image 310 for rendering the pass-through view from the color camera of the host 100. In an embodiment, the reference image 310 is, for example, an RGB image corresponding to the real-world scene in front of the user/the host 100, but the disclosure is not limited thereto.

In step S220, the processor 104 determines coordinate transformation information 330 based on camera information 320 of the host 100.

In the embodiment of the disclosure, the camera information 320 of the host 100 includes first camera information corresponding to the color camera and second camera information corresponding to the tracking camera of the host 100. The tracking camera is at least used to track the target object.

In an embodiment, the first camera information includes intrinsic parameters, extrinsic parameters, and a first camera pose of the color camera. In addition, the second camera information includes intrinsic parameters and extrinsic parameters of the tracking camera.

Generally speaking, intrinsic parameters of a camera refer to parameters related to an internal optical structure of the camera during an imaging process thereof. The parameters include a focal length, a principal point, a pixel scaling factor, lens distortion coefficients, etc. In addition, extrinsic parameters of a camera refer to a spatial pose of the camera relative to an external world, including a rotation matrix and translation vector of the camera, which may be used to define a relationship between a camera coordinate system and a world coordinate system.

On this basis, people having ordinary skills in the art should be able to understand concepts of the intrinsic parameters and the extrinsic parameters of the above-mentioned color camera and/or tracking camera. Therefore, the same details will not be repeated in the following.

In some embodiments, the first camera pose is, for example, a pose of the color camera relative to the tracking camera, but the disclosure may not be limited thereto.

In the embodiments of the disclosure, each mentioned term of "pose" may be characterized as the corresponding 6 degree-of-freedom (DOF) data, but the disclosure is not limited thereto.

In the scenario of FIG. 3, the processor 104 may, for example, determine the coordinate transformation information 330 based on the camera information 320 by executing a coordinate transformation calculation algorithm A01.

In the embodiment of the disclosure, the coordinate transformation information 330 is used to convert/shift/change a rendering position from a preset rendering position to a reference rendering position.

In an embodiment, the rendering position is a position used for rendering the virtual object (e.g., an MR object), and the preset rendering position includes a position of the eyes of the user. In addition, the reference rendering position corresponds to the color camera.

Furthermore, in the conventional technology, when rendering the virtual object, the HMD will render the virtual object at the preset rendering position, that is, corresponding to the position of the eyes of the user. However, if the host 100 applies the coordinate transformation information 330 when rendering the virtual object, the virtual object may be changed to be rendered at the reference rendering position, that is, corresponding to a position of the color camera, but the disclosure is not limited thereto.

In an embodiment, the coordinate transformation information 330 is, for example, a transformation matrix that may transfer the rendering position to the reference rendering position, but the disclosure is not limited thereto.

In step S230, the processor 104 determines a reference reprojection parameter 340 based on a preset reprojection parameter of the host 100, the camera information 320 of the host 100, and the coordinate transformation information 330.

In an embodiment, the processor 104 may obtain a predefined visual range of the mixed reality service, and determine the reference reprojection parameters 340 corresponding to the predefined visual range based on the preset reprojection parameter of the host 100, the camera information 320 of the host 100, and the coordinate transformation information 330.

In some embodiments, the preset reprojection parameter of the host 100 is, for example, an original hardware reprojection parameter of the display (e.g., the near-eye display) on the host 100. Furthermore, in the existing technology, during a process of rendering the MR object on the host 100 (e.g., HMD), the above-mentioned original hardware reprojection parameter is required to be considered to reproject the MR object in order to complete the rendering of the MR object.

However, compared to directly using the above-mentioned original hardware reprojection parameter for rendering the MR object, in the embodiment of the disclosure, the reference reprojection parameter 340 is further determined through step S230, and reprojection is performed based on the reference reprojection parameter 340 during the subsequent process of generating MR visual content. In this way, an issue of user dizziness caused by the change in the rendering position (for example, changing from the preset rendering position to the reference rendering position) may be resolved.

In the embodiment of the disclosure, the predefined visual range is, for example, a predefined range within a field of view provided by an application of the MR service, and the range may depend on a type of applications and/or the way it interacts with the user.

In an embodiment, assuming that the user will mainly focus on a certain area in the entire field of view when using the application of the MR service, the area may be set as the predefined visual range by relevant developers.

For example, assuming that one of functions of the application of the MR service is to present a virtual operation area corresponding to a computer desktop on a plane in front of the user (e.g., a table), the predefined visual range may be set by the relevant developers to a range corresponding to the virtual operation area, but the disclosure may not be limited thereto.

In the scenario of FIG. 3, the processor 104 may execute a reprojection parameter calculation algorithm A02 to determine the reference reprojection parameter 340 corresponding to the predefined visual range based on the preset reprojection parameter, the camera information 320, and the coordinate transformation information 330.

In different embodiments, the reprojection parameter calculation algorithm A02 may be, for example, implemented based on the technology recorded in documents associated with least square, linear regression, or the like, but the disclosure is not limited thereto.

In step S240, the processor 104 renders a virtual object 360 corresponding to the target object to be rendered based on object information of the target object to be rendered and coordinate transformation information 330.

In the embodiment of the disclosure, the target object is, for example, a physical object that may be tracked by the host 100 and accordingly rendered into a corresponding MR object, such as the hands of the user, a handheld controller, a tracker, etc., but the disclosure is not limited thereto.

In FIG. 3, the processor 104 may render the virtual object 360 through a rendering algorithm A03, for example.

In different embodiments, the rendering algorithm A03 may be implemented based on the technology recorded in documents associated with ray tracing, rasterization, or the like, but the disclosure is not limited thereto.

For ease of understanding, it is assumed below that the target object is the hand of the user. In this case, the host 100 may, for example, track a pose of the hand (which may, for example, be characterized as a pose of each of joint points on the hand (e.g., 6 DOF data)), and accordingly render a virtual hand object as the above-mentioned virtual object 360, but the disclosure may not be limited thereto.

In different embodiments, the object information of the target object may include, for example, information of the target object, such as a shape, pose, speed, and angular velocity, but the disclosure is not limited thereto.

According to characteristics of the coordinate transformation information 330, the rendered virtual object 360 will be rendered at the reference rendering position (e.g., the position of the color camera).

In step S250, the processor 104 combines the virtual object 360 with the reference image 310 into a pass-through view 370.

In FIG. 3, the processor 104 may, for example, execute a superimposing algorithm A04 to superimpose the virtual object 360 on the reference image 310 to form the pass-through view 370. For example, in an embodiment where the target object is assumed to be the hands of the user, the reference image 310 may include an image region capturing the hands of the user. In this case, the processor 104 may, for example, superimpose (or align) the virtual object 360 (e.g., the virtual hand object) on the image area to form the pass-through view 370. However, the disclosure is not limited thereto.

In different embodiments, the superimposing algorithm A04 may be implemented based on the technology recorded in documents associated with alpha masking, alpha blending, or the like, but the disclosure is not limited thereto.

In step S260, the processor 104 reprojects the pass-through view 370 into visual content 380 of the mixed reality service based on the reference reprojection parameter 340, and displays the visual content 380.

In FIG. 3, the processor 104 may, for example, execute a reprojection algorithm A05 to reproject the pass-through view 370 into the visual content 380 based on the reference reprojection parameter 340.

In different embodiments, the reprojection algorithm A05 may be implemented based on the technology recorded in documents associated with perspective warping or the like, but the disclosure is not limited thereto. In some embodiments, the reprojection algorithm A05 may be used to warp the pass-through view 370 to the visual content 380, which may be another pass-through view reprojected based on the reference reprojection parameter 340, but the disclosure is not limited thereto.

Furthermore, since the rendering position has been changed, if the pass-through view 370 is directly presented to the user for viewing, the user may feel dizzy or unrealistic.

However, since the process of generating the visual content 380 involves reprojection performed based on the reference reprojection parameter 340, the visual content 380 may not only provide a more realistic visual effect, but also allow the virtual objects 360 in the screen to be aligned with the image area corresponding to the target object.

In addition, since the method in the embodiment of the disclosure may generate the visual content 380 without using depth warping technology, there will be no distortion in the screen of the visual content 380.

Figure 4A:
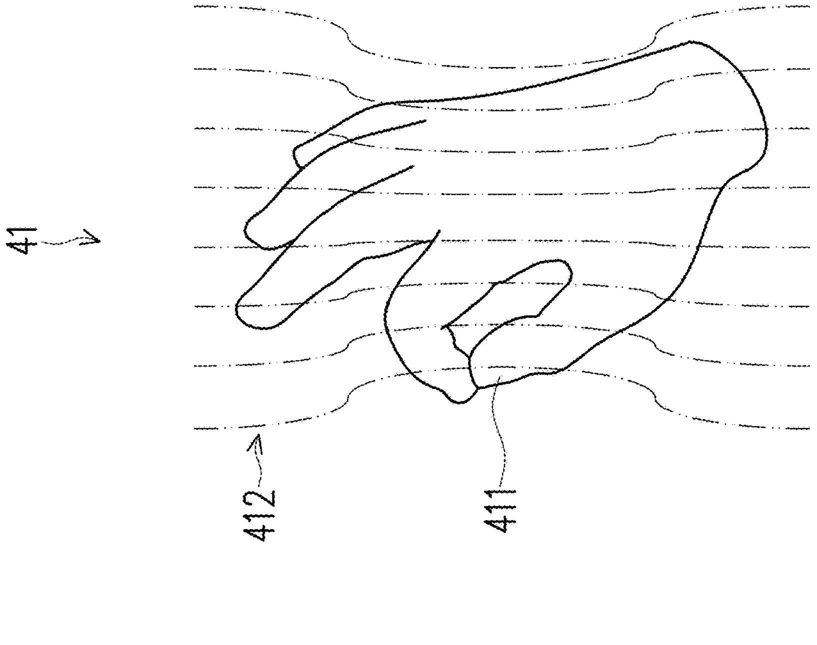
FIGS. 4A to 4C are schematic diagrams of visual effects according to embodiments of the disclosure.
Figure 4B:
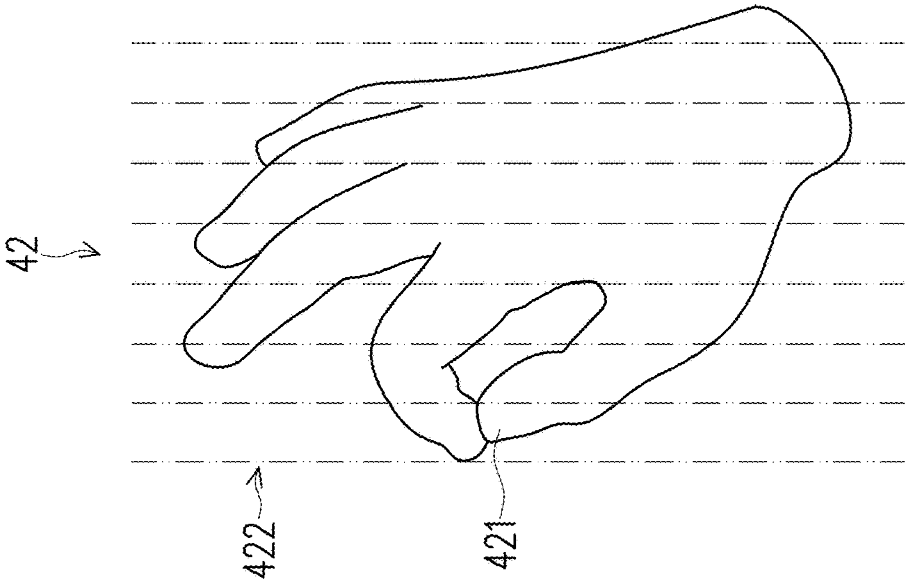
Figure 4C:
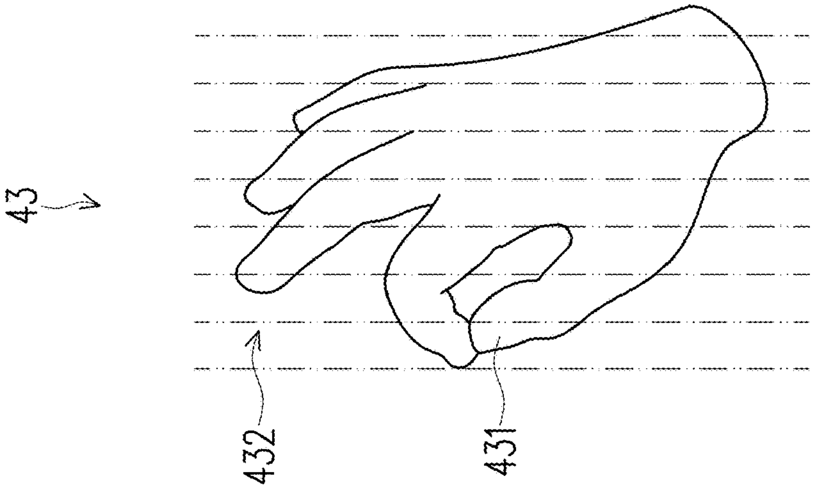

For better understanding the concept of the disclosure, FIGS. 4A to 4C would be used as examples for description. FIGS. 4A to 4C are schematic diagrams of visual effects according to embodiments of the disclosure.

In FIG. 4A, the visual content 41 is, for example, the MR visual content generated by applying depth warping technology, which includes a pass-through view 412 overlaid with a virtual object 411. The virtual object 411 is, for example, a virtual hand object rendered based on the tracked target object (such as the hand of the user).

In the scenario of FIG. 4A, although the virtual object 411 may be aligned with the tracked target object, a background thereof is also distorted accordingly.

In FIG. 4B, the visual content 42 is, for example, the MR visual content (which may also be understood as the pass-through view 370) presented without applying the reference reprojection parameter 340 for reprojection, which includes a pass-through view 422 overlaid with a virtual object 421. The virtual object 421 is, for example, a virtual hand object rendered based on the tracked target object (such as the hand of the user).

In the scenario of FIG. 4B, although the virtual object 421 may be aligned with the tracked target object, and a background thereof is not distorted, the virtual object 421 may be overly enlarged, causing visual incongruity.

In FIG. 4C, the visual content 43 is, for example, the MR visual content (which may also be understood as the visual content 380) generated after applying the method in the embodiment of the disclosure, which includes a pass-through view 432 overlaid with a virtual object 431. The virtual object 431 is, for example, a virtual hand object rendered based on the tracked target object (such as the hand of the user).

In the scenario of FIG. 4C, not only the virtual object 431 may be aligned with the tracked target object and the background thereof is not distorted, but also the virtual object 431 will not be overly enlarged. Therefore, the visual incongruity may be effectively reduced.

In summary, the method provided in the embodiment of the disclosure may avoid distortion in the pass-through view by changing the rendering position. In addition, by using additionally determined reference reprojection parameter during the process of performing the reprojection, it is possible to prevent the final MR visual content from making the user feel dizzy or unrealistic. In this way, the visual experience of the user may be improved.

Although the disclosure has been described with reference to the above embodiments, they are not intended to limit the disclosure. It will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. A method for improving a mixed reality service, executed by a host, comprising:
- obtaining a reference image for rendering a pass-through view from a color camera of the host;
- determining coordinate transformation information based on camera information of the host, wherein the coordinate transformation information is used to convert a rendering position from a preset rendering position to a reference rendering position;
- obtaining a predefined visual range of the mixed reality service;
- determining a reference reprojection parameter corresponding to the predefined visual range based on a preset reprojection parameter of the host, the camera information of the host, and the coordinate transformation information;
- rendering a virtual object corresponding to a target object to be rendered based on object information of the target object to be rendered and the coordinate transformation information;
- combining the virtual object with the reference image into the pass-through view; and
- reprojecting the pass-through view into visual content of the mixed reality service based on the reference reprojection parameter, and displaying the visual content.

2. The method according to claim 1, wherein the camera information of the host comprises first camera information corresponding to the color camera and second camera information corresponding to a tracking camera of the host, wherein the tracking camera is at least used to track the target object.

3. The method according to claim 2, wherein the first camera information comprises intrinsic parameters, extrinsic parameters, and a first camera pose of the color camera, and the second camera information comprises intrinsic parameters and extrinsic parameters of the tracking camera.

4. The method according to claim 1, wherein the rendering position is a position used to render the virtual object.

5. The method according to claim 1, wherein the reference rendering position corresponds to the color camera.

6. The method according to claim 1, wherein the preset rendering position comprises a position of eyes of a user.

7. A host for improving a mixed reality service, comprising:
- a non-transitory storage circuit storing a program code; and
- a processor coupled to the non-transitory storage circuit and configured to access the program code to perform:
- obtaining a reference image for rendering a pass-through view from a color camera of the host;
- determining coordinate transformation information based on camera information of the host, wherein the coordinate transformation information is used to convert a rendering position from a preset rendering position to a reference rendering position;
- obtaining a predefined visual range of the mixed reality service;
- determining a reference reprojection parameter corresponding to the predefined visual range based on a preset reprojection parameter of the host, the camera information of the host, and the coordinate transformation information;
- rendering a virtual object corresponding to a target object to be rendered based on object information of the target object to be rendered and the coordinate transformation information;
- combining the virtual object with the reference image into the pass-through view; and
- reprojecting the pass-through view into visual content of the mixed reality service based on the reference reprojection parameter, and displaying the visual content.

8. The host according to claim 7, wherein the camera information of the host comprises first camera information corresponding to the color camera and second camera information corresponding to a tracking camera of the host, wherein the tracking camera is at least used to track the target object.

9. The host according to claim 8, wherein the first camera information comprises intrinsic parameters, extrinsic parameters, and a first camera pose of the color camera, and the second camera information comprises intrinsic parameters and extrinsic parameters of the tracking camera.

10. The host according to claim 7, wherein the rendering position is a position used to render the virtual object.

11. The host according to claim 7, wherein the reference rendering position corresponds to the color camera.

12. The host according to claim 7, wherein the preset rendering position comprises a position of eyes of a user.

* * * * *